John E. Brown & Stephen S Bartlett.
Improvements in Harvesters.
N° 10.320.    Patented Dec. 20. 1853.
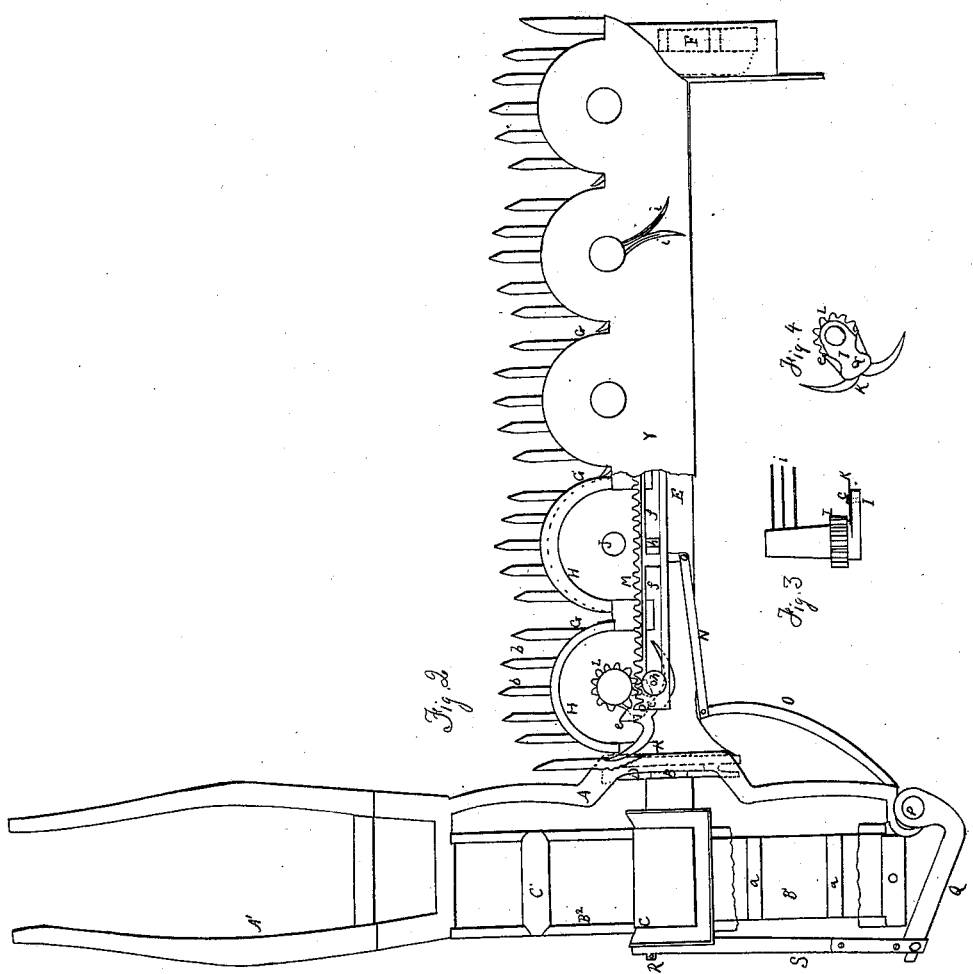
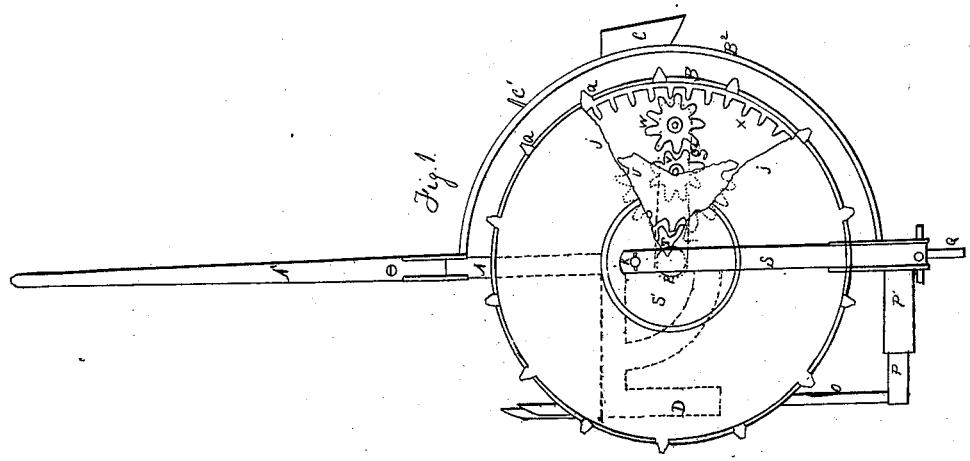

UNITED STATES PATENT OFFICE.

JNO. E. BROWN AND S. S. BARTLETT, OF WOONSOCKET, RHODE ISLAND.

IMPROVEMENT IN GRAIN AND GRASS HARVESTERS.

Specification forming part of Letters Patent No. 10,320, dated December 20, 1853.

*To all whom it may concern:*

Be it known that we, JOHN E. BROWN and STEPHEN S. BARTLETT, both of Woonsocket, in the county of Providence and State of Rhode Island, have invented certain new and useful Improvements in Machines for Harvesting Grain and Grass, and for such other purposes as it may be used to advantage; and we do hereby declare that the same are described and represented in the following specification and drawings.

To enable others skilled in the art to make and use our improvements, we will proceed to describe their construction and operation, referring to the drawings, in which the same letters indicate like parts in each of the figures.

Figure 1 is an elevation of one end. Fig. 2 is a top view. Some of the parts are represented as broken off in each figure to show others.

In these drawings, A is a strong frame, with a pair of shafts, A', fastened to it, between which shafts the animal to draw the machine may be harnessed in the usual manner or otherwise. In the center of the frame A the stud or axle B is fastened, and the wheel B' is fitted to turn upon it, and the tire of the wheel is furnished with projections $a\ a$ to prevent it from slipping. The top of the wheel B' is covered with a circular frame, B², which is fastened to the frame A, and provided with a seat, C, and foot-rest C' for the driver, as represented. The stand is fastened to the frame A, and is made in the form represented, and the toothed cutter-bar E is fastened to the lower portion of this stand, and is made in the form represented, and the outer end is supported by the wheel F, (represented in dotted lines,) which wheel turns on a stud fastened into a projection from the back of the bar E, the front of which bar is provided with a number of curves, G G, which are furnished with a series of teeth, $b\ b$, which project into the grass or grain in advance of the cutters. There is a circular rim, H, around the curves G, which forms a cavity for the sweep I, which vibrates upon the stud J, fastened in the center of the curve. The two-bladed knife K is made in the form represented, and fitted to vibrate on the screw $c$ in the sweep I, and when the knife swings either way the required distance the back portion, $e$, of the center comes in contact with the hub of the sweep I and stops it in a proper position to cut the grass or grain, when it is carried round alternately in each direction over the curve G and teeth $b$ by the sweep I, which is fastened to the pinion L, which is operated by the rack M, which rack is made in the form represented, with a series of slots, $f f$, fitted to the studs $h\ h$, which studs are fastened into the bar E to support the rack, and upon which it traverses, being operated by the link N, which connects it to the lever O, fastened to the rock-shaft P, which is fitted to work in the tube P', fastened to the frame A. The rock-shaft P is operated by the lever Q, which is fastened to it and connected to the crank-pin R by the link S, as represented. The crank-pin R is fastened into the crank-wheel S', which is fastened to the pinion T, fitted to turn on the end of the axle B. The arm $g$, (represented by dotted lines,) fastened to the axle B between the wheel B' and pinion T, which arm has two studs fastened in it for the gear U, pinion V, and pinion W to turn upon, the rim of the wheel B' being made to project over, and provided with teeth X on the inside, which drive the pinion W, which meshes with the pinion V, connected to the gear U, which drives the pinion T and crank-wheel S', which carries the crank-pin S and operates the several parts of the machine heretofore enumerated to carry the knives K and cut the grass or grain, which is supported when it is cut by the teeth $b$ and curve G, over which the knife sweeps; and if the grass or grain is partially dried, so as to cut hard, the curves G G may have stationary knives fastened to them, made in the form of the curve, with the edge projecting a little beyond it, as represented at G', to act in concert with the vibrating knife K, and aid materially in severing the stalks of grain or grass. The bar E, curves G, pinions, and rack are all covered with a case, Y, which is perforated for the studs J and hubs of the pinions L, which project up through it, and a series of sweepers or gatherers, $i\ i$, are fastened into the hubs of the pinions, so as to follow the knives each way and gather the grain or grass cut and throw it so as to let it fall behind the bar E. Those who prefer to do so may remove the sweepers $i\ i$ and allow the grass or grain to fall onto and over the case Y and slip off behind it, and should it be desirable or necessary the hubs of the pinions L and the studs J may be made so short as to be entirely covered by the case Y. Fig. 3 is an elevation of one of the pinions L and the sweepers attached to it; and Fig. 4, a view of the bottom, showing the sweep I, &c. The face of the wheel B' is covered with a case, $jj$, except what is covered by the crank-wheel S'. In the drawings the case $j$ is broken away to show the gearing, which gearing is entirely inclosed and protected from injury.

What we claim as our invention, and desire to secure by Letters Patent, is—

1. The double-bladed or two-edged knife K, or its equivalent, so constructed as to cut in each direction as it is vibrated, substantially as described.

2. The knife K, in combination with the curves G G and teeth $b\,b$.

3. The mode of operating the double-bladed knives or cutters K K by means of the rack M and pinions L L, substantially as set forth.

4. The arrangement of the devices which communicate the motion from the internal part of the driving-wheel to the rack M, substantially as set forth.

5. The gearing arranged and combined so as to work within the main wheel $B^2$ and operate the crank upon the axle of the main wheel, substantially as described.

In testimony whereof we have hereunto signed our names before two subscribing witnesses.

JOHN E. BROWN.
STEPHEN S. BARTLETT.

Witnesses:
J. DENNIS, Jr.,
B. K. MORSELL.